US007445341B2

(12) United States Patent
Conner

(10) Patent No.: US 7,445,341 B2
(45) Date of Patent: Nov. 4, 2008

(54) FOUR PANEL LIQUID CRYSTAL DISPLAY SYSTEM

(75) Inventor: Arlie R. Conner, Portland, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 503 days.

(21) Appl. No.: 11/232,149

(22) Filed: Sep. 21, 2005

(65) Prior Publication Data

US 2007/0064426 A1 Mar. 22, 2007

(51) Int. Cl.
G03B 21/14 (2006.01)
(52) U.S. Cl. .......................................... 353/20; 353/31
(58) Field of Classification Search ................... 353/20, 353/30, 31
See application file for complete search history.

(56) References Cited

U.S. PATENT DOCUMENTS

| | | | |
|---|---|---|---|
| 4,127,322 A | | 11/1978 | Jacobson et al. |
| 4,189,653 A | * | 2/1980 | Hiratuka et al. ........... 310/68 D |
| 4,842,374 A | | 6/1989 | Ledebuhr |
| 5,512,967 A | * | 4/1996 | Bohannon .................... 353/31 |
| 5,517,340 A | | 5/1996 | Doany et al. |
| 5,921,650 A | | 7/1999 | Doany et al. |
| 5,962,114 A | | 10/1999 | Jonza et al. |
| 5,971,545 A | | 10/1999 | Haitz |
| 6,113,239 A | | 9/2000 | Sampsell et al. |
| 6,545,804 B2 | | 4/2003 | Chuang |
| 6,550,919 B1 | | 4/2003 | Heine |
| 6,626,539 B2 | * | 9/2003 | van Gelder et al. ........... 353/20 |
| 6,628,346 B1 | | 9/2003 | Ebiko |
| 6,635,337 B2 | | 10/2003 | Jonza et al. |
| 6,779,893 B2 | | 8/2004 | O'Connor |
| 6,781,765 B2 | | 8/2004 | Edlinger et al. |
| 6,816,206 B2 | | 11/2004 | Yamamoto |
| 6,827,452 B2 | | 12/2004 | Tzong et al. |
| 6,829,090 B2 | | 12/2004 | Katsumata et al. |
| 6,834,963 B2 | | 12/2004 | Kim et al. |
| 6,840,626 B2 | | 1/2005 | Ikeda et al. |
| 6,851,812 B2 | | 2/2005 | Newell et al. |
| 6,856,747 B2 | | 2/2005 | Cloud et al. |
| 6,857,747 B2 | | 2/2005 | Pentico et al. |
| 6,874,890 B2 | * | 4/2005 | Haino et al. .................. 353/31 |
| 7,270,416 B2 | * | 9/2007 | Yamanaka et al. ............ 353/20 |
| 2003/0184715 A1 | | 10/2003 | Dho |
| 2004/0227994 A1 | | 11/2004 | Ma et al. |
| 2005/0134811 A1 | | 6/2005 | Magarill et al. |

FOREIGN PATENT DOCUMENTS

KR 2003-0061173 7/2003

OTHER PUBLICATIONS

Roth et al., "Four Primary Color Projection Display", *SID 05 Digest*, pp. 1818-1821 (2005).

* cited by examiner

*Primary Examiner*—Christopher Mahoney

(57) ABSTRACT

A microdisplay projection system employs blue, red and green LED illuminators. Optics are provided to direct light from the blue LED illuminator to a blue LCD panel, to direct light from the red LED illuminator to a red LCD panel, and to direct light from the green LED illuminator to first and second green LCD panels.

8 Claims, 3 Drawing Sheets

FOUR PANEL LIQUID CRYSTAL DISPLAY SYSTEM

BACKGROUND OF THE INVENTION

The present invention relates to a microdisplay projection system, and more particularly to a microdisplay projection system that employs LED illuminators and four LCD panels, with two green LCD panels being used to boost the total amount of green light provided to a display.

A typical projection display system can include a source of light, illumination optics, an image-forming device, projection optics and a projection screen. The illumination optics collect light from a light source and direct it to one or more image-forming devices. The image-forming device, controlled by an electronically conditioned and processed digital video signal, produces an image corresponding to the video signal. Projection optics then magnify the image and project it onto the projection screen. White light sources, such as arc lamps, in conjunction with color wheels have been used as light sources for projection display systems. However, recently light emitting diodes (LEDs) have been introduced as an alternative source of light. Some advantages of LEDs include longer lifetime, higher efficiency and superior thermal characteristics.

In order to employ LEDs as the light source in a projection display system, LEDs of at least the three primary colors (red, green and blue) are used. In many systems, a separate image-forming device is provided for each of these colors. The quantity of imaged light output from each image-forming device is based on the quantity of light provided by the LEDs of each color. This relationship can potentially be problematic if the quantity of light that can be produced by different colors of LEDs is different. Testing of existing LED technology has shown that green LEDs produce approximately half as much light as red and blue LEDs. There is a need in the art to address this inequality of light production by red, green and blue LEDs in a projection display system.

BRIEF SUMMARY OF THE INVENTION

The present invention is a microdisplay projection system that employs blue, red and green LED illuminators. Optics are provided to direct light from the blue LED illuminator to a blue LCD panel, to direct light from the red LED illuminator to a red LCD panel, and to direct light from the green LED illuminator to first and second green LCD panels.

DETAILED DESCRIPTION

Figure 1:
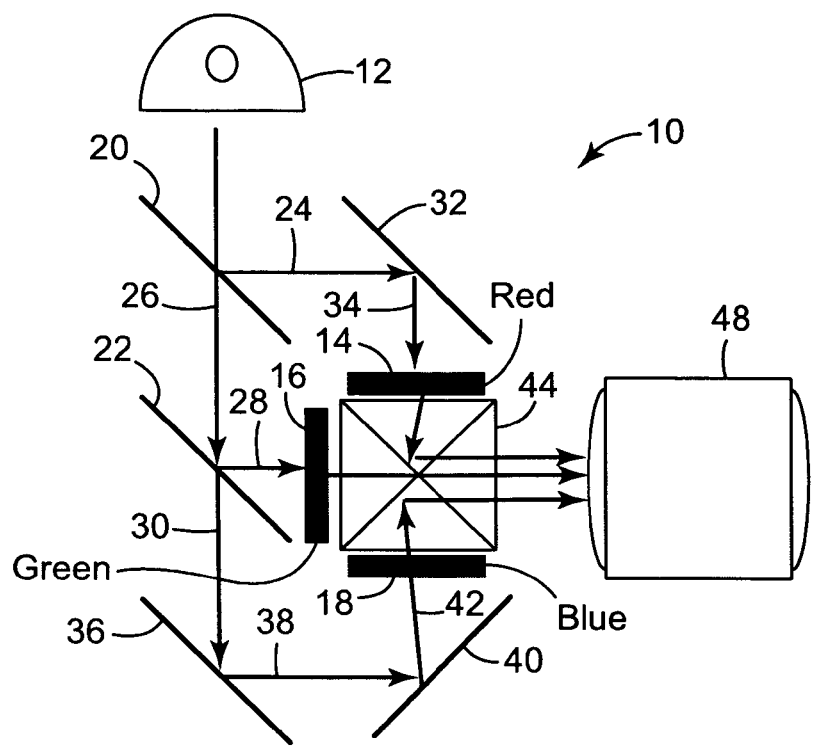
FIG. 1 is a diagram illustrating a prior art microdisplay projection system employing a white light source and three transmissive LCD image-forming panels.

FIG. 1 is a diagram illustrating exemplary prior art microdisplay projection system 10 employing white light source 12 and three transmissive LCD image-forming panels 14, 16 and 18. Dichroic mirrors 20 and 22 are located to separate primary colors from the white light produced by white light source 12. Dichroic mirror 20 reflects red light to path 24 and transmits green and blue light in path 26. Dichroic mirror 22 reflects green light to path 28 and transmits blue light in path 30. Red light in path 24 is reflected by mirror 32 to path 34 toward red LCD image-forming panel 14. Green light in path 28 is directed toward green LCD image-forming panel 16. Blue light in path 30 is reflected by mirror 36 to path 38, and blue light in path 38 is then reflected by mirror 40 to path 42 toward blue LCD image-forming panel 18. The outputs of LCD image-forming panels 14, 16 and 18 are input to "x-cube" color combining prism 44. Color combining prism 44 is configured in a manner known in the art to emit red imaged light output from red LCD image-forming panel 14, green imaged light output from green LCD image-forming panel 16, and blue imaged light from blue LCD image-forming panel 18 toward projection lens 48.

In operation, LCD image-forming panels 14, 16 and 18 are independently controlled to produce a gray-scaled image in red, green and blue, respectively. These images are superimposed together to form a full-color image at the output of color combining prism 44 that is projected by projection lens 48 onto a display screen.

Figure 2:
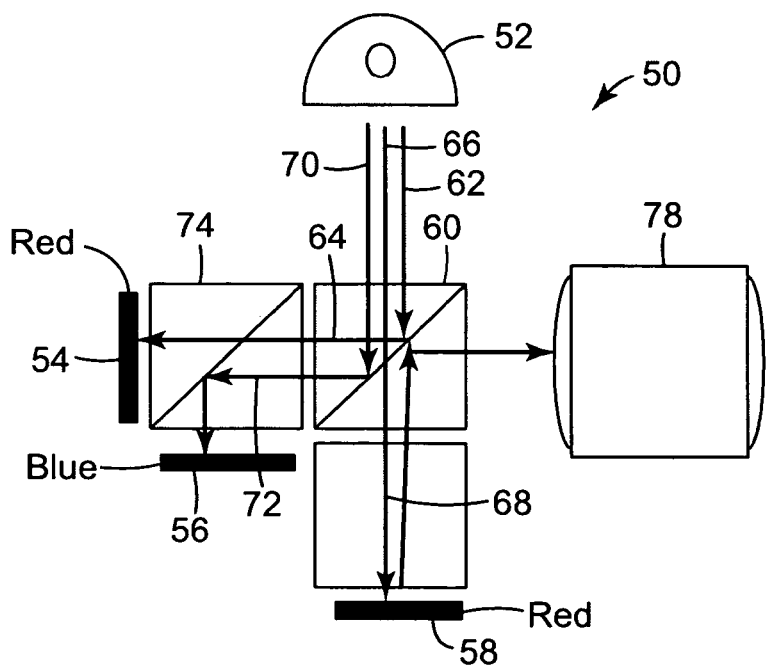
FIG. 2 is a diagram illustrating a prior art microdisplay projection system employing a white light source and three liquid crystal on silicon (LCoS) reflective LCD image-forming panels.

FIG. 2 is a diagram illustrating exemplary prior art microdisplay projection system 50 employing white light source 52 and three liquid crystal on silicon (LCoS) reflective LCD image-forming panels 54, 56 and 58. Polarization beam splitter (PBS) prism 60, which is a MacNeille-type prism in an exemplary embodiment, is located to receive the white light produced by white light source 52 and split it into red, blue and green components. Red light component 62 produced by white light source 52 is reflected by PBS prism 60 to path 64. Green light component 66 is transmitted through PBS prism 60 in path 68. Blue light component 70 is reflected by PBS prism 60 to path 72.

In the system of FIG. 2, the red, blue and green components of light entering PBS prism 60 are pre-polarized so that the red and blue components have a polarization that is orthogonal to the polarization of the green light, such as by employing a color filter retarder stack. This allows PBS prism 60 to reflect red and blue light entering the prism from light source 52 while transmitting green light entering the prism from light source 52.

Dichroic prism 74 transmits the red light in path 64 toward red LCoS reflective LCD image-forming panel 54, and reflects the blue light in path 72 toward blue LCoS reflective image-forming panel 56. Operation of the red LCoS reflective LCD image-forming panel 54 causes the imaged light output by the panel 54 to have a polarization that is rotated 90 degrees from the polarization of incoming red light in path 64. This rotated-polarization imaged red light is transmitted through dichroic prism 74 to PBS prism 60, where it is then transmitted on to projection lens 78 by virtue of the polarization characteristics of PBS prism 60, which reflects red light of a first polarization and transmits red light of a polarization that is rotated 90 degrees from the first polarization.

Operation of the blue LCoS reflective LCD image-forming panel 56 causes the imaged light output by the panel 56 to have a polarization that is rotated 90 degrees from the polarization of incoming blue light in path 72. This rotated-polarization imaged blue light is reflected by dichroic prism 74 to PBS prism 60, where it is then transmitted on to projection lens 78 by virtue of the polarization characteristics of PBS prism 60, which reflects blue light of a first polarization and transmits blue light of a polarization that is rotated 90 degrees from the first polarization.

Green light in path 68 passes through PBS prism 60 toward green LCoS reflective image-forming panel 58. Operation of the green LCoS reflective LCD image-forming panel 58 causes the imaged light output by the panel 58 to have a polarization that is rotated 90 degrees from the polarization of incoming green light in path 68. This rotated-polarization imaged green light is reflected by PBS prism 60 on to projection lens 78 by virtue of the polarization characteristics of PBS prism 60, which transmits green light of a first polarization and reflects green light of a polarization that is rotated 90 degrees from the first polarization.

In operation, LCoS reflective LCD image-forming panels 54, 56 and 58 are controlled independently to produce a gray-scaled image in red, blue and green, respectively. These images are superimposed together to form a full-color image at the output of PBS prism 60 that is projected by projection lens 78 onto a display.

The systems shown in FIGS. 1 and 2 utilize one image-forming device for each primary color. However, in a system where LEDs are used for illumination instead of an arc lamp, inequality in the amount of light produced by different colors of LEDs can result in unequal color brightness in images produced by the system. An LED-based system according to exemplary embodiments of the present invention is described below.

Figure 3:
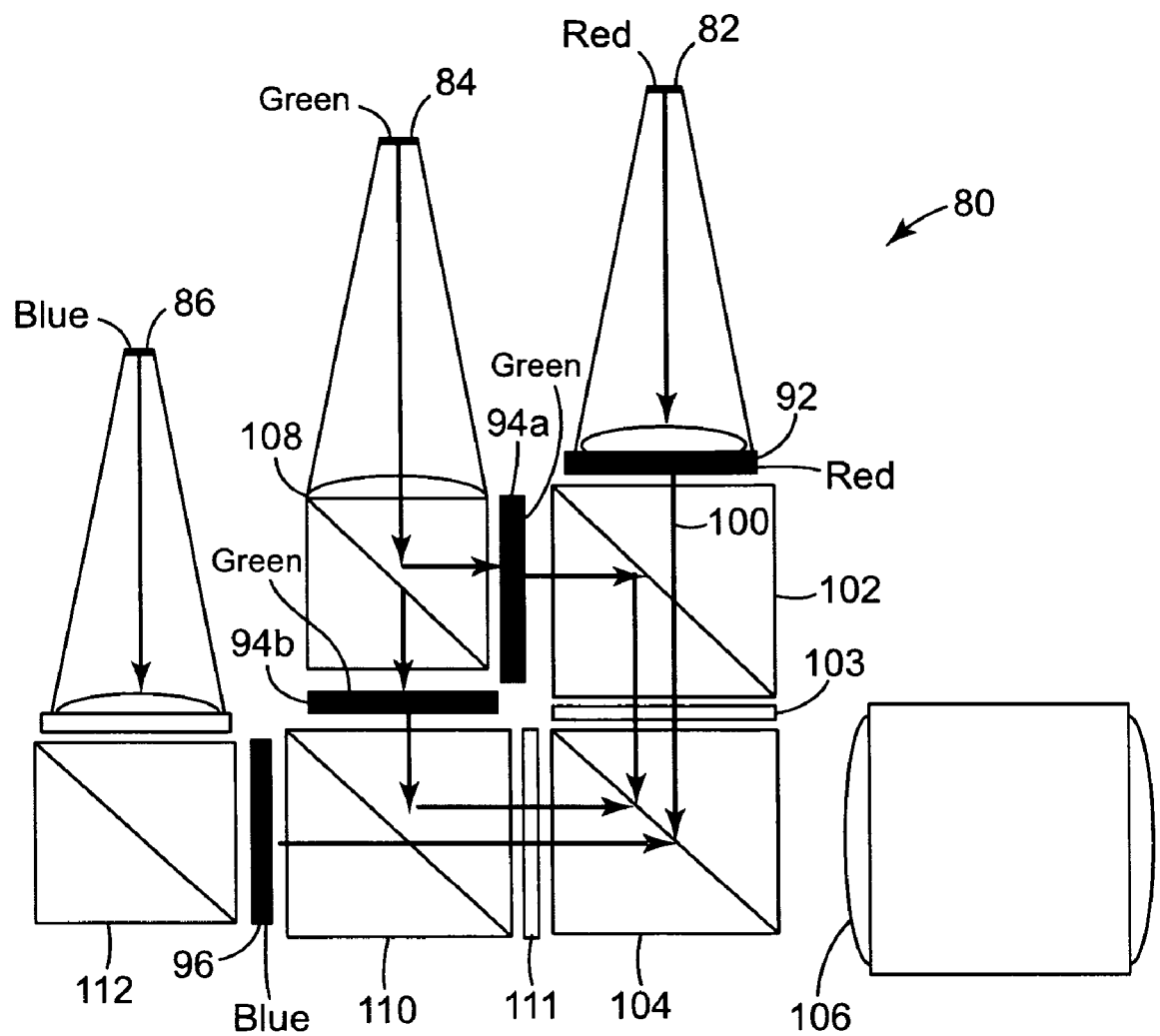
FIG. 3 is a diagram illustrating a microdisplay projection system according to a first embodiment of the present invention, employing red, green and blue LED illuminators and four transmissive LCD image-forming panels.

FIG. 3 is a diagram illustrating microdisplay projection system 80 according to a first embodiment of the present invention, employing red, green and blue LED illuminators 82, 84 and 86, and four transmissive LCD image-forming panels 92, 94a, 94b and 96. In the following description, transmissive LCD image-forming panels 92, 94a, 94b and 96 are referred to as red, green and blue panels based on the light that each panel receives for ease of explanation; those skilled in the art will understand that each of these panels is operable to image any color of light, as is known in the art.

Red LED illuminator 82 provides red light to red transmissive LCD image-forming panel 92, which outputs imaged red light in path 100. In one exemplary embodiment, the red light provided by red LED illuminator 82 is pre-polarized to provide only red light of a so-called S polarization (a reflecting polarization) to red transmissive LCD image-forming panel 92, which rotates the polarization of the imaged red light in path 100 to a so-called P polarization (a transmitting polarization). The imaged red light in path 100 is transmitted by dichroic prism 102, which is configured to transmit red light and reflect green light. The imaged red light then passes through polarization rotator 103, which rotates the polarization of the imaged red light to the S polarization before the imaged red light enters PBS prism 104. In an exemplary embodiment, PBS prism 104 is a MacNeille type prism that is configured to reflect light of the S polarization and transmit light of the P polarization. The imaged red light of the S polarization is reflected by PBS prism 104 toward projection lens 106.

In an alternative embodiment, another type of polarization beam splitter could be used to achieve the functionality of PBS prism 104, such as a multilayer optical film (MOF) based polarizing reflector, a wire grid polarizer, or other types of polarizing optics. It should be understood by those skilled in the art that alternative types of polarization beam splitting components could be employed in each instance below where a PBS prism is disclosed.

Green LED illuminator 84 provides green light to PBS prism 108, which in an exemplary embodiment employs a MOF based polarizer, such as a matched z-index polarizing (MZIP) film disclosed in U.S. Pat. No. 6,635,337, assigned to 3M Innovative Properties Company. PBS prism 108 reflects green light having an S polarization toward green transmissive LCD image-forming panel 94a, and transmits green light having a P polarization on to green transmissive LCD image-forming panel 94b. The green light of the S polarization is imaged and rotated in polarization by green transmissive LCD image-forming panel 94a, so that imaged green light of the P polarization is transmitted to dichroic prism 102. The imaged green light of the P polarization is reflected by dichroic prism 102 through polarization rotator 103, which rotates the polarization of the imaged green light to the S polarization before the imaged green light enters PBS prism 104. The imaged green light of the S polarization is then reflected by PBS prism 104 toward projection lens 106.

Green light of the P polarization that is transmitted by PBS prism 108 is imaged and rotated in polarization by green transmissive LCD image-forming panel 94b, so that imaged green light of the S polarization is transmitted to dichroic prism 110. Dichroic prism 110 is configured to transmit blue light and reflect green light, and thus reflects the imaged green light of the S polarization through color-specific polarization rotator 111, which is configured to rotate the polarization of only green light passing through it. Polarization rotator 111 rotates the polarization of the imaged green light to the P polarization before the imaged green light enters PBS prism 104. The imaged green light of the P polarization is then transmitted through PBS prism 104 toward projection lens 106.

Blue LED illuminator 86 provides blue light to prism 112, which in one exemplary embodiment is a MZIP PBS pre-polarizing prism that reflects only S polarized light. In other embodiments, the blue light provided by blue LED illuminator is pre-polarized (S polarized), so that prism 112 can be a right angle (RA) prism or a fold mirror, for example. Prism 112 reflects blue light of the S polarization toward blue transmissive LCD image-forming panel 96. Imaged blue light, rotated 90 degrees to a P polarization, is output from blue transmissive LCD image-forming panel 96 and transmitted through dichroic prism 110 and color-specific polarization rotator 111 (which does not rotate the polarization of blue light) to PBS prism 104. PBS prism 104 then transmits the imaged blue light of the P polarization toward projection lens 106.

Although polarization rotators 103 and 111 have been described above as being located between two prisms, it will be understood by those skilled in the art that the rotators may be laminated to one or more appropriate prisms as an exemplary mounting configuration. In addition, other geometric arrangements, such as locating certain optical components of the system in a different plane or other configurations, are also contemplated within the scope of the present invention.

In operation, LCD image-forming panels 92, 94a, 94b and 96 are independently controlled to produce a gray-scaled image in red, green, green and blue, respectively. These images are superimposed together to form a full-color image at the output of PBS prism 104 that is projected by projection lens 106 onto a display.

By splitting the green light produced by green LED illuminator 84 into two components of orthogonal polarizations for delivery to two LCD image-forming panels 94a and 94b, and then recombining the outputs of panels 94a and 94b for projection onto a display, the total green light output of microdisplay projection system 80 can be significantly enhanced.

In practice, LCD image-forming panels 94a and 94b are controlled in such a way that the image data for each panel is reversed with respect to the other panel, so that the images can be combined properly taking into account the opposite polarizations of green light incident to the panels. This boosting of green light output can help to alleviate the general lack of sufficient green light output of LED-based projection systems due to the lower light output of green LEDs in comparison to red and blue LEDs. Furthermore, the configuration shown in FIG. 3 achieves the boosting of green light output without adding significant area, complexity or expense to the system.

Figure 4:
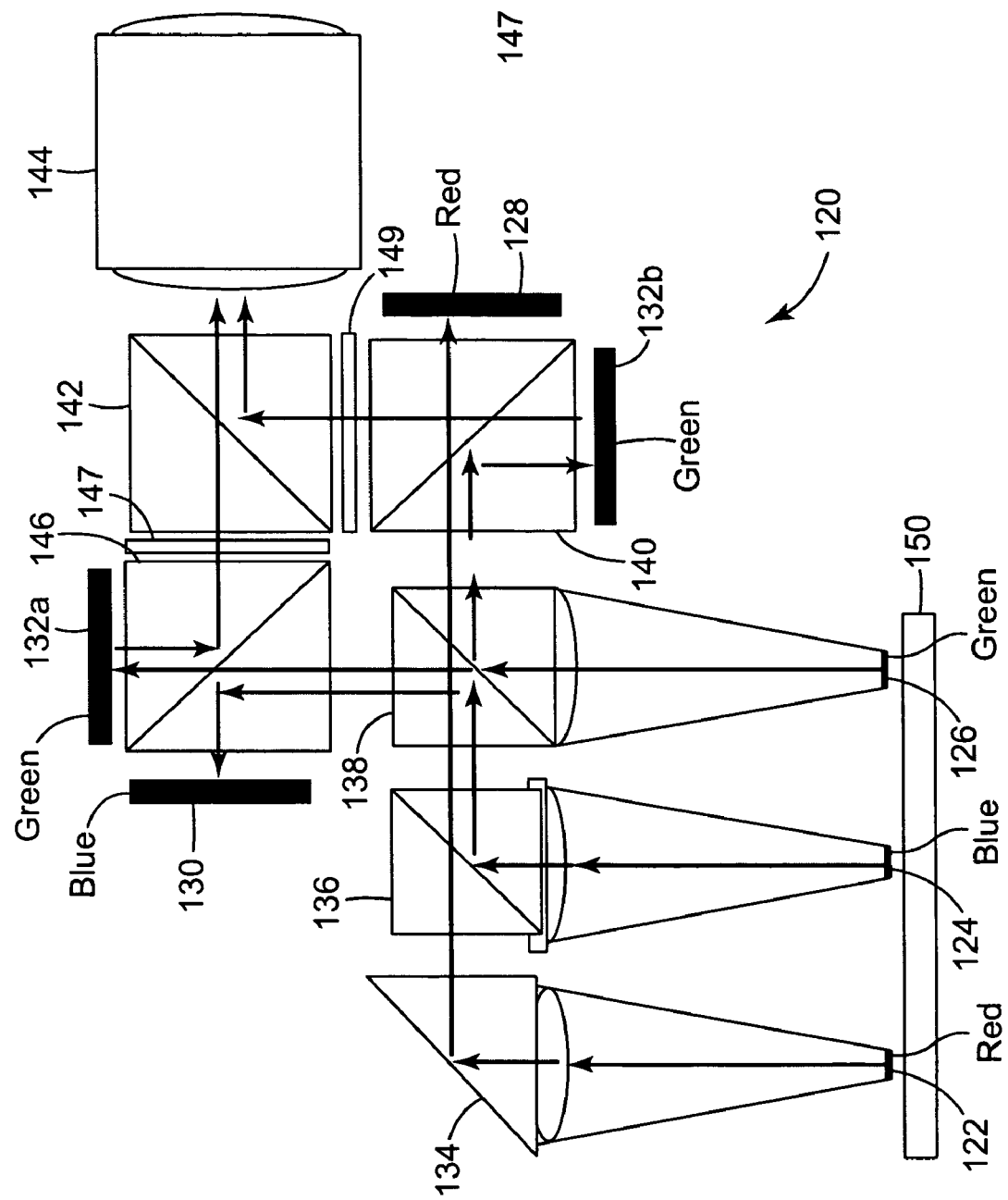
FIG. 4 is a diagram illustrating a microdisplay projection system according to a second embodiment of the present invention, employing red, green and blue LED illuminators and four LCoS reflective LCD image-forming panels.

FIG. 4 is a diagram illustrating microdisplay projection system 120 according to a second embodiment of the present invention, employing red, blue and green LED illuminators 122, 124 and 126, respectively, and four LCoS reflective LCD image-forming panels 128, 130, 132a and 132b. Red light from red LED illuminator 122 is reflected by right angle prism 134 (which could be a fold mirror in another embodiment) toward PBS prism 136, which employs an MZIP film in an exemplary embodiment so that P polarized (a transmitting polarization) light is transmitted while S polarized (a reflecting polarization) light is reflected. PBS prism 136 transmits P polarized red light on to PBS prism 138, which also employs an MZIP film in an exemplary embodiment. PBS prism 138 transmits the P polarized red light on to PBS prism 140, which again employs an MZIP film in an exemplary embodiment. PBS prism 140 transmits the P polarized red light toward red LCoS reflective LCD image-forming panel 128. Imaged red light having a polarization rotated to the S polarization is output from panel 128 back to PBS prism 140, which reflects the imaged S polarized red light on to PBS prism 142, which is a MacNeille prism in an exemplary embodiment. PBS prism 142 reflects the imaged S polarized red light toward projection lens 144.

Blue light from blue LED illuminator 124 having the S polarization is reflected by PBS prism 136 to PBS prism 138. PBS prism 138 reflects the S polarized blue light to PBS prism 146, which employs an MZIP film in an exemplary embodiment. PBS prism 146 reflects the S polarized blue light toward blue LCoS reflective LCD image-forming panel 130. Imaged blue light having a polarization rotated to the P polarization is output from panel 130 back to PBS prism 146, which transmits the imaged P polarized blue light on to PBS prism 142. PBS prism 142 transmits the imaged P polarized blue light toward projection lens 144.

Green light from green LED illuminator 126 having a P polarization is transmitted by PBS prism 138 on to PBS prism 146. PBS prism 146 transmits the P polarized green light toward green LCoS reflective LCD image-forming panel 132a. Imaged green light having a polarization rotated to the S polarization is output from panel 132a back to PBS prism 146, which reflects the imaged S polarized green light toward color-specific polarization rotator 147 located between PBS prism 146 and PBS prism 142. Color-specific polarization rotator 147, which is configured to rotate the polarization of only green light, rotates the polarization of the imaged S polarized green light exiting PBS prism 146 to the P polarization. The imaged P polarized green light then enters PBS prism 142, which transmits the imaged P polarized green light toward projection lens 144.

Green light from green LED illuminator 126 having an S polarization is reflected by PBS prism 138 to PBS prism 140. PBS prism 140 reflects the S polarized green light toward green LCoS reflective LCD image-forming panel 132b. Imaged green light having a polarization rotated to the P polarization is output from panel 132b back to PBS prism 140, which transmits the imaged green light of the first polarization toward color-specific polarization rotator 149 located between PBS prism 140 and PBS prism 142. Color-specific polarization rotator 149, which is configured to rotate the polarization of only green light, rotates the polarization of the imaged P polarized green light exiting PBS prism 140 to the S polarization. The imaged S polarized green light then enters PBS prism 142, which reflects the imaged S polarized green light toward projection lens 144.

Although color-specific polarization rotators 147 and 149 have been described above as being located between two prisms, it will be understood by those skilled in the art that the color-specific rotators may be laminated to one or more appropriate prisms as an exemplary mounting configuration. In addition, although color-specific polarization rotators 147 and 149 have been described as rotating the polarization of green, those skilled in the art will recognize that a similar effect may be achieved by changing the location of projection lens 144 (such as to a position above PBS prism 142 in FIG. 4) so that the path of the green light is correct, and by utilizing blue and red color-specific rotators for color specific polarization rotators 147 and 149, respectively, to adjust the path of blue and red light to reach the new location of projection lens 144. Other geometric arrangements, such as locating certain optical components of the system in a different plane or other configurations, are also contemplated within the scope of the present invention.

In operation, LCD image-forming panels 128, 130, 132a and 132b are independently controlled to produce a grayscaled image in red, blue, green and green, respectively. These images are superimposed together to form a full-color image at the output of PBS prism 142 that is projected by projection lens 144 onto a display.

Similar to the transmissive LCD embodiment of FIG. 3, the LCoS embodiment of FIG. 4 splits the green light produced by green LED illuminator 126 into two components of orthogonal polarizations for delivery to two LCD image-forming panels 132a and 132b, and then recombines the outputs of panels 132a and 132b for projection onto a display. This provides a significant increase in the total amount of green light output by microdisplay projection system 80. This boosting of green light output can help to alleviate the general lack of sufficient green light output of LED-based projection systems due to the lower light output of green LEDs in comparison to red and blue LEDs.

In some configurations of the system shown in FIGS. 3 and 4, all of the red, green and blue illuminators are mounted on a common heat sink, such as a liquid-cooled heat sink substrate. An example of such a substrate is shown in simplified form as substrate 150 in FIG. 4.

EXAMPLE

A system configured in the manner shown in FIG. 3 was modeled and tested to determine the level of enhancement of green light output from the system. In a system that employs LCD panels having a diagonal of 0.85 inches (21.6 millimeters) and LEDs that have an output brightness of 100 lumens per millimeter, the 4-panel transmissive LCD system shown in FIG. 3 achieves 180 lumens of output brightness compared to 140 lumens of output brightness for a 3-panel LCoS system. This increase in brightness is achieved without adding expense, as the components of the 4-panel transmissive LCD system shown in FIG. 3 cost approximately the same as the components of a 3-panel LCoS system.

The present invention, described above with respect to two exemplary embodiments, provides a microdisplay projection system that effectively employs LED illuminators by boosting the green light output from the green LED illuminator in order to provide a system light output that has increased brightness while maintaining the balance of red, blue and green colors. The system of the present invention achieves this result in a compact, inexpensive manner. It will be understood by those skilled in the art that the boosting of green has been selected by the disclosed embodiments of the present invention to address current shortcomings in the brightness of light produced by green LEDs, and that the boosting of other colors could be achieved as well according to the principles of the invention.

The present invention has been described as employing optical components that work with light having S and P polarizations, which is nomenclature that defines the polarizations of light based on whether the light is reflected (S polarized) or transmitted (P polarized) by the optical components of the system. Those skilled in the art will understand that two paths of light described as being S polarized may have different actual polarizations, as long as the light in each path has the characteristic of being reflected by the optical components of the system. Similarly, two paths of light described as being P polarized may have different actual polarizations, as long as the light in each path has the characteristic of being transmitted by the optical components of the system. The S and P polarizations disclosed herein are illustrative, showing how the configurations of the present invention can split certain colors of light provided in a display system into components of different polarizations in order to optically manipulate the light in the manner disclosed.

Although the present invention has been described with reference to preferred embodiments, workers skilled in the art will recognize that changes may be made in form and detail without departing from the spirit and scope of the invention.

What is claimed is:

1. A microdisplay projection system comprising:
   a blue LED illuminator;
   a red LED illuminator;
   a green LED illuminator;
   optics for directing light from the blue LED illuminator to a blue LCD image-forming panel, for directing light from the red LED illuminator to a red LCD image-forming panel, and for directing light from the green LED illuminator to first and second green LCD image-forming panels;
   wherein the blue LCD panel, the red LCD panel, and the first and second green LCD panels are transmissive LCD panels; and
   wherein the optics comprise:
   a first polarizing mechanism arranged to provide blue light of a reflecting polarization from the blue LED illuminator through the blue transmissive LCD image-forming panel to yield imaged blue light of a transmitting polarization;
   a first polarization beam splitter arranged to:
      transmit green light of the transmitting polarization from the green LED illuminator through the first green transmissive LCD image-forming panel to yield imaged green light of the reflecting polarization; and
      reflect green light of the reflecting polarization from the green LED illuminator through the second green transmissive LCD image-forming panel to yield imaged green light of the transmitting polarization;
   a second polarization mechanism arranged to provide red light of the reflecting polarization from the red LED illuminator through the red transmissive LCD image-forming panel to yield imaged red light of the transmitting polarization;
   a first dichroic prism configured and arranged to transmit the imaged red light of the transmitting polarization and to reflect the imaged green light of the transmitting polarization;
   a first polarization rotator configured and arranged to rotate the polarization of the imaged red light of the transmitting polarization to the reflecting polarization and to rotate the polarization of the imaged green light of the transmitting polarization to the reflecting polarization;
   a second dichroic prism configured and arranged to transmit the imaged blue light of the transmitting polarization and to reflect the imaged green light of the reflecting polarization;
   a second polarization rotator configured and arranged to rotate the polarization of the imaged green light of the reflecting polarization to the transmitting polarization; and
   a second polarization beam splitter configured and arranged to:
      transmit the green light of the transmitting polarization from the second polarization rotator toward projection optics;
      transmit the blue light of the transmitting polarization transmitted by the second dichroic prism toward the projection optics;
      reflect the green light of the reflecting polarization from the first polarization rotator toward the projection optics; and
      reflect the red light of the reflecting polarization from the first polarization rotator toward the projection optics.

2. The microdisplay projection system of claim 1, wherein green light of a first polarization is directed to the first green LCD image-forming panel and green light of a second polarization orthogonal to the first polarization is directed to the second green LCD image-forming panel.

3. A microdisplay projection system comprising:
   a blue LED illuminator;
   a red LED illuminator;
   a green LED illuminator;
   optics for directing light from the blue LED illuminator to a blue LCD image-forming panel, for directing light from the red LED illuminator to a red LCD image-forming panel, and for directing light from the green LED illuminator to first and second green LCD image-forming panels;
   wherein the blue LCD panel, the red LCD panel, and the first and second green LCD panels are reflective LCoS panels; and
   wherein the optics comprise:
   a reflector arranged to reflect red light from the red LED illuminator;
   a first polarization beam splitter configured and arranged to:
      reflect blue light of a reflecting polarization provided by the blue LED illuminator; and
      transmit red light of a transmitting polarization that is reflected by the reflector;
   a second polarization beam splitter configured and arranged to:
   transmit red light of the transmitting polarization transmitted by the first polarization beam splitter;
      reflect blue light of the reflecting polarization reflected by the first polarization beam splitter;
      transmit green light of the transmitting polarization provided by the green LED illuminator; and
      reflect green light of the reflecting polarization provided by the green LED illuminator;

a third polarization beam splitter configured and arranged to:
  transmit red light of the transmitting polarization transmitted by the second polarization beam splitter to the red reflective LCoS image-forming panel. and reflect imaged red light of the reflecting polarization reflected from the red reflective LCoS image-forming panel; and
  reflect green light of the reflecting polarization reflected by the second polarization beam splitter to a first green reflective LCoS image-forming panel, and transmit imaged green light of the transmitting polarization reflected from the first green reflective LCoS image-forming panel;
a fourth polarization beam splitter configured and arranged to:
  reflect blue light of the reflecting polarization reflected by the second polarization beam splitter to the blue reflective LCoS image-forming panel, and transmit imaged blue light of the transmitting polarization reflected from the blue reflective LCoS image-forming panel; and
  transmit green light of the transmitting polarization reflected by the second polarization beam splitter to the second green reflective LCoS image- forming panel, and reflect imaged green light of the reflecting polarization reflected from the second green reflective LCoS image-forming panel;
a first color-specific rotator configured and arranged to convert the imaged green light of the transmitting polarization transmitted by the third polarization beam splitter into imaged green light of the reflecting polarization;
a second color-specific rotator configured and arranged to convert the imaged green light of the reflecting polarization reflected by the fourth polarization beam splitter into imaged green light of the transmitting polarization; and
a fifth polarization beam splitter configured and arranged to:
  reflect imaged red light of the reflecting polarization reflected by the third polarization beam splitter toward the projection optics;
  reflect imaged green light of the reflecting polarization passing through the first color-specific rotator toward the projection optics;
  transmit imaged blue light of the transmitting polarization transmitted by the fourth polarization beam splitter toward the projection optics; and
  transmit imaged green light of the transmitting polarization passing through the second color-specific rotator toward the projection optics.

4. The microdisplay projection system of claim 1 or 3, wherein the blue illuminator, the red illuminator and the green illuminator are mounted to a common cooling mechanism.

5. The microdisplay projection system of claim 1 or 3, wherein the first and second green LCD panels arc controlled in coordination to perform a common imaging function.

6. The microdisplay projection system of claim 1 or 3, further comprising color combining optics for directing light from the blue LCD panel, the red LCD panel, and the first and second green LCD panels to projection optics.

7. The microdisplay projection system of claim 6, wherein the color combining optics comprise a polarization beam splitter.

8. The microdisplay projection system of claim 7, wherein the polarization beam splitter is a MacNeille type prism.

* * * * *

UNITED STATES PATENT AND TRADEMARK OFFICE
CERTIFICATE OF CORRECTION

PATENT NO. : 7,445,341 B2
APPLICATION NO. : 11/232149
DATED : November 4, 2008
INVENTOR(S) : Arlie R. Conner It is certified that error appears in the above-identified patent and that said Letters Patent is hereby corrected as shown below:

Column 9
Line 5, In Claim 3, delete "panel." and insert -- panel, --, therefor.

Signed and Sealed this

Tenth Day of February, 2009

JOHN DOLL
*Acting Director of the United States Patent and Trademark Office*